D. B. BRIGGS.
BAKER'S DEVICE.
APPLICATION FILED MAY 26, 1911.
1,125,804.
Patented Jan. 19, 1915.
3 SHEETS—SHEET 1.
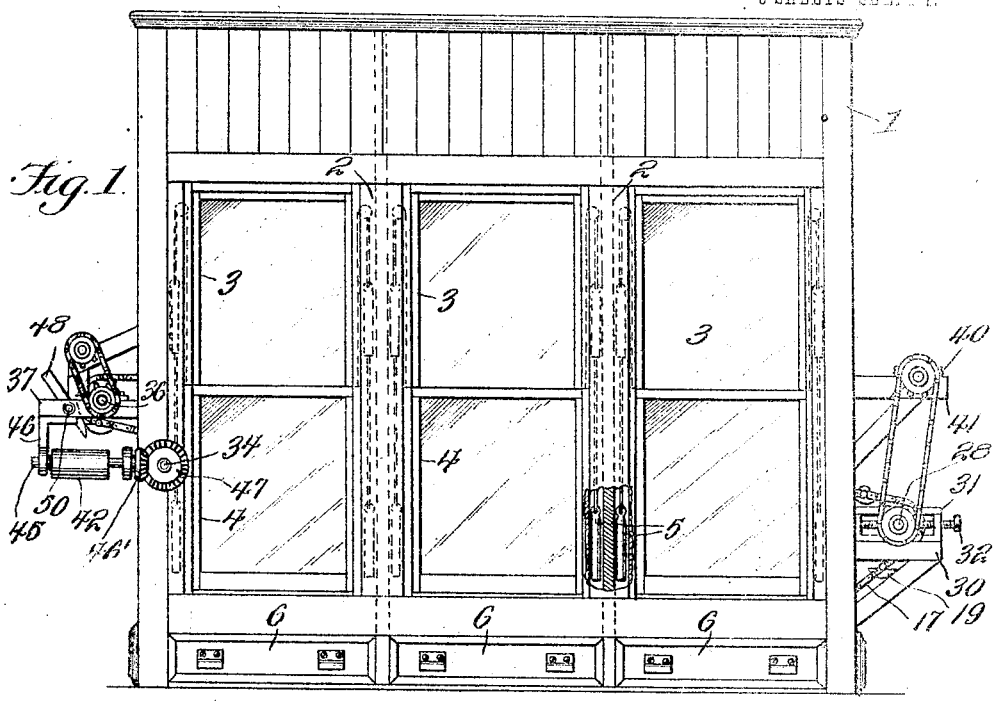
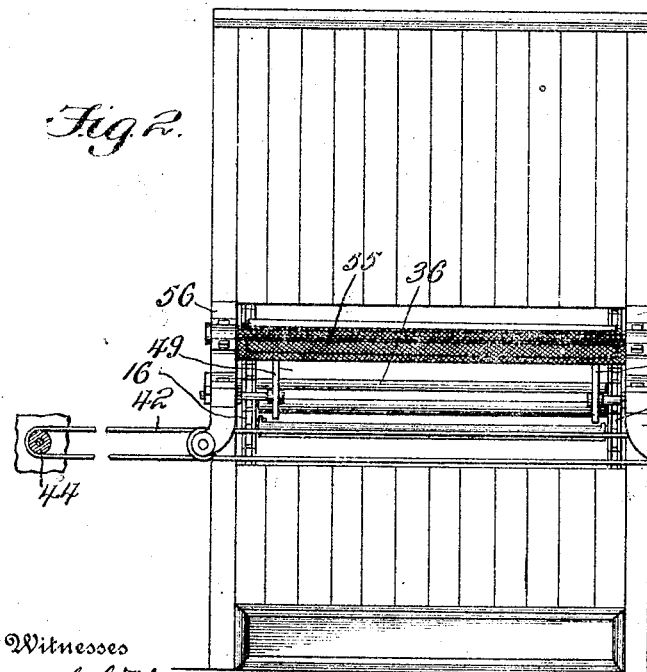
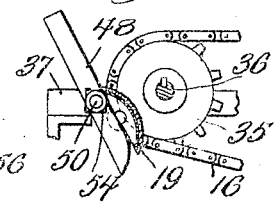
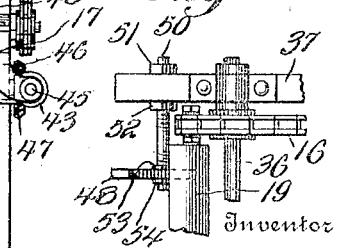
Witnesses
J. L. Wright
Inventor
Darius B. Briggs,
By Victor J. Evans,
Attorney D. B. BRIGGS.
BAKER'S DEVICE.
APPLICATION FILED MAY 26, 1911.
1,125,804. Patented Jan. 19, 1915.
3 SHEETS—SHEET 2.
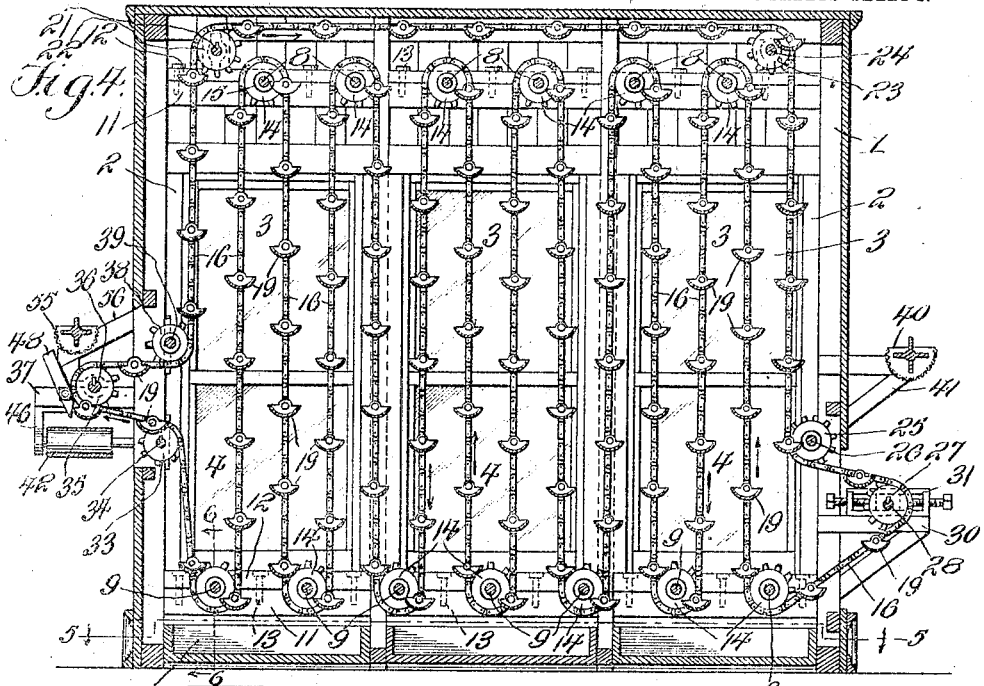
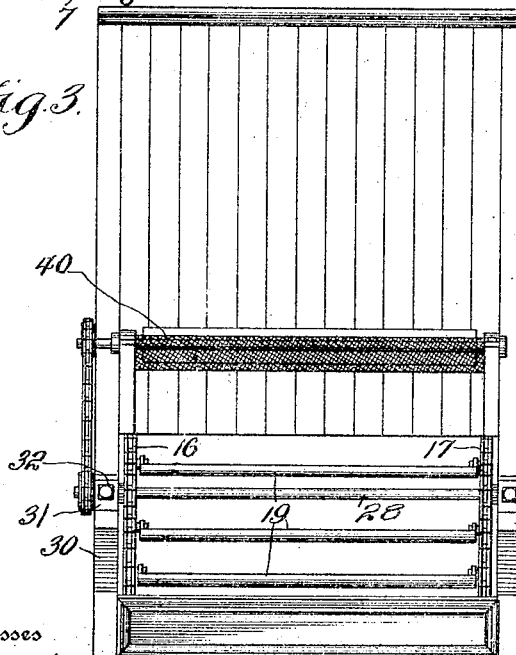
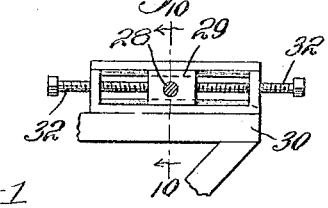
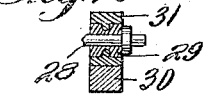
Witnesses
J. L. Wright
E. Edmonston Jr.
Inventor
Darius B. Briggs,
By Victor J. Evans,
Attorney

D. B. BRIGGS.
BAKER'S DEVICE.
APPLICATION FILED MAY 26, 1911.

1,125,804.

Patented Jan. 19, 1915.

3 SHEETS—SHEET 3.

Witnesses
J. L. Wright
C. Edmondston Jr.

Inventor
Darcus B. Briggs,
By Victor J. Evans,
Attorney

UNITED STATES PATENT OFFICE.

DARIUS B. BRIGGS, OF DAYTON, OHIO.

BAKER'S DEVICE.

1,125,804. Specification of Letters Patent. Patented Jan. 19, 1915.

Application filed May 26, 1911. Serial No. 629,564.

*To all whom it may concern:*

Be it known that I, DARIUS B. BRIGGS, a citizen of the United States, residing at Dayton, in the county of Montgomery and State of Ohio, have invented new and useful Improvements in Bakers' Devices, of which the following is a specification.

This invention relates to bakers' proofing devices and the object of the invention is the provision of a device wherein the bread may be carried directly from the mixers or loaf formers to the baking pans ready for the ovens.

A further object of the invention is the provision of means for sifting flour upon the loaf buckets and upon the bread therein and for automatically dumping the buckets on to a conveyer, whereby the loaves may be transported to a point where they may be conveniently placed in baking pans. The dough, while passing through the machine, rises sufficiently to be immediately thereafter placed in the oven.

Further objects of the invention will appear as the following specific description is read in connection with the accompanying drawings, which form a part of this application, and in which:—

Figure 5:
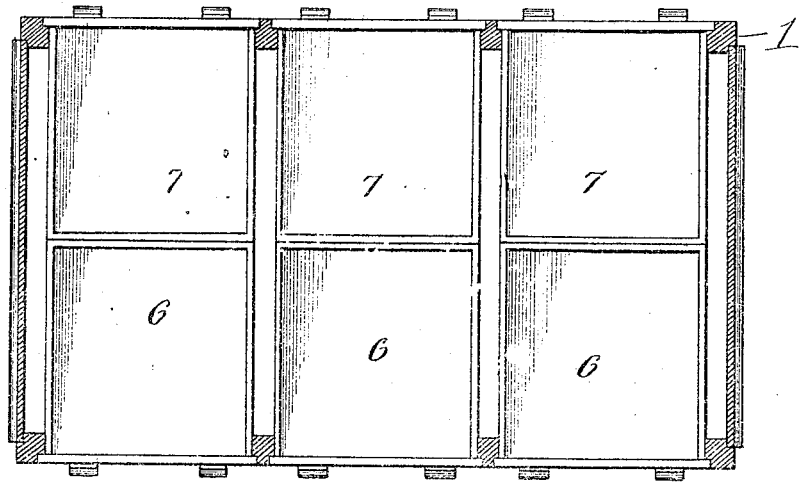
Figure 6:
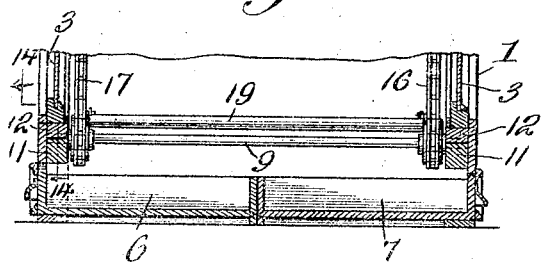
Figure 11:
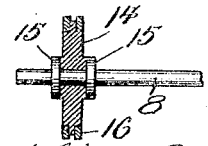
Figure 12:
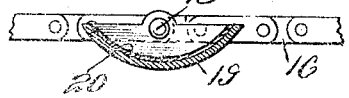
Figure 14:
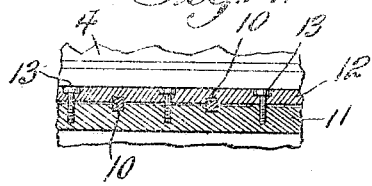
Figure 13:
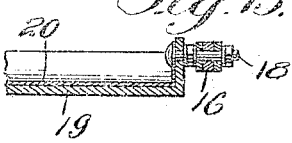

Figure 1 is a front elevation. Fig. 2 is a left hand end elevation. Fig. 3 is a right hand end elevation. Fig. 4 is a vertical longitudinal section. Fig. 5 is a horizontal section on the line 5—5 of Fig. 1. Fig. 6 is a detail transverse vertical section. Fig. 7 is a detail vertical sectional view showing the position of the tripping levers. Fig. 8 is a detail top plan view thereof. Fig. 9 is a detail elevation of the chain adjusting mechanism. Fig. 10 is a section on the line 10—10 of Fig. 9. Fig. 11 is a detail sectional view through one of the chain sprockets. Fig. 12 is a detail transverse sectional view through one of the buckets. Fig. 13 is a detail longitudinal section therethrough. Fig. 14 is a detail vertical longitudinal section on the line 14—14 of Fig. 6.

Referring more particularly to the drawings, 1 represents a casing having a plurality of sash frames 2 mounted therein in which sashes 3 and 4 are mounted and controlled in the usual manner by counterweights 5.

At the bottom of the casing a plurality of drawers 6 and 7 are slidably mounted in suitable guides from the front and rear of the casing, for a purpose to be hereinafter described.

Mounted in the casing and extending transversely thereacross is a plurality of shafts 8 and 9, which are provided with squared ends 10 adapted to be received between the supporting board 11 and the clamping boards 12 which are held in position upon the supporting board by screws 13. This arrangement prevents the shafts from rotating and permits their ready removal when desired.

Loosely journaled upon opposite ends of each shaft are sprocket wheels 14 positioned against longitudinal movement by the collars 15 and having traveling thereover the sprocket chains 16 and 17. These sprocket chains have swiveled to opposite links, by means of headed bolts 18, the buckets 19 which are substantially crescent shaped in cross section and which are preferably lined with canvas or other suitable material, as shown at 20, the buckets extending entirely between the chains and having sufficient weight to normally hold them in upright position.

Journaled in the casing, adjacent the upper portion thereof, is a driving shaft 21 having sprockets 22 arranged at either end adapted to receive the chains 16 and 17 and to drive them over the sprockets 14 upon the shafts 8 and 9. the shaft 21 being connected to any suitable source of power. After passing over the sprockets 22 upon the shaft 21 the chains 16 and 17 pass over similar sprockets 23 upon the shaft 24 journaled in the upper part of the casing parallel with the shaft 21. The chains then pass over sprockets 25 on the shaft 26 journaled in bearings at the right hand side of the casing and from thence over sprockets 27 on a shaft 28 which is journaled in bearing blocks 29 mounted to slide upon the bracket arms 30 in guide frames 31. The opposite ends of the guide frames have adjusting screws 32 threaded therein which bear against the ends of the bearing boxes 29 and hold them in adjusted position. From this point the chains pass over the sprocket wheels 14 upon the first shaft of the series 9, and from there extend upwardly and downwardly, as shown in Fig. 4, over the sprocket wheels 14 upon the shafts 8 and 9 until the opposite or left hand end of the machine is reached. At this, the left hand end of the machine, all chains pass over sprocket wheels 33 arranged at opposite ends of a shaft 34 journaled in bearings at the side of the casing and from there pass over sprocket wheels 35 mounted upon the shaft 36 journaled in bearings upon the bracket arms 37 extending horizontally from the casing. The chains are then returned to the hollow sprockets 22 over the sprockets 38 upon the shaft 39 journaled in bearings immediately above the shaft 34. The dough, in the form of loaves, is placed in buckets at the right hand end immediately below the sifter 40 which is supported upon brackets 41 and is carried entirely through the machine in the path shown by the arrows in Fig. 4 until it reaches the aperture in the opposite wall of the machine, where it is dumped on to a conveyer 42 which is in the form of a continuous belt mounted upon rollers 43 and 44.

The roller 43 is secured upon a shaft 45 whose ends are journaled respectively in the casing and in an arm 46 depending from the bracket 37. The conveyer is positioned directly under the shaft 36 and in such position as to receive the loaves from the tripping mechanism to be now described.

The shaft 45 is provided, at its inner end, with a beveled gear 46' which meshes with a similar gear 47 carried at the end of the shaft 34, so that the conveyer is continuously driven during the operation of the machine.

The tripping mechanism comprises a pair of adjustably pivoted levers 48 and 49, carried upon the outer ends of stub shafts 50 which project from the brackets 37 and have adjusting nuts 51 thereon and lock nuts 52. The arrangement of the adjusting and lock nuts 51 and 52 upon the stub shafts 50 permits their adjustment toward or away from the brackets 37, while the nuts 53 and 54, upon the ends of the shaft, permit the pivotal adjustment of the arms 48. The lower end of each arm 48 is beveled away so as to strike the outer edge of the bucket, upset the same, dump the contents thereof onto the conveyer and permit the continued movement of the bucket.

Immediately above the tripping mechanism another sifter 55 is supported upon bracket arms 56 in such a manner that the conveyer may be properly coated with flour and also the board where it leaves the buckets.

It will thus be seen that dough in the unraised state may be placed in the trays or troughs in the form of loaves and passed through the machine to the conveyer, their passage occupying a sufficient space of time to permit the proper raising of the bread for the ovens. In this manner a continuous supply of loaves may be fed to the conveyer and at all times may be inspected through the sashes 3 and 4. Any loaves dropping from the troughs will be caught in the drawers 6 and 7 and may be readily removed therefrom and placed upon the trough exposed at the adjusting end and the loaves are protected from dust, dirt or other foreign matter from the loaf-forming machines to the conveyer, or practically to the ovens, thus, in a measure at least, insuring a clean product.

Having thus described the invention, what I claim as new is:—

In combination, a casing forming an oven and provided with an opening in one end wall thereof, a plurality of sprockets journaled within the casing, chains movable over the said sprockets and provided with loaf carrying buckets, brackets secured to said casing adjacent said opening, a shaft journaled in said brackets, sprockets carried by said shaft and operatively associated with said chains which extend through said opening to provide a discharge, stub shafts mounted in the brackets, rearwardly of the first mentioned shaft and arranged in parallelism therewith, trip arms pivotally mounted on said stub shafts, said arms being adjustable longitudinally on said shafts, and means for locking said arms in any pivotal adjusted position.

In testimony whereof I affix my signature in presence of two witnesses.

DARIUS B. BRIGGS.

Witnesses:
  NATHANIEL FULTON,
  WILLIAM ANDREWS.